United States Patent
Kendall

[15] 3,674,995
[45] July 4, 1972

[54] COMPUTER CONTROLLED DEVICE TESTING AND SUBSEQUENT ARBITRARY ADJUSTMENT OF DEVICE CHARACTERISTICS

[72] Inventor: Don Leslie Kendall, Richardson, Tex.
[73] Assignee: Texas Instruments Inc., Dallas, Tex.
[22] Filed: Aug. 31, 1970
[21] Appl. No.: 68,100

[52] U.S. Cl. ...............................235/151.1, 29/574, 324/73
[51] Int. Cl. ....................................G06f 15/46, G05b 15/00
[58] Field of Search ................29/574, 584, 590; 235/151.1, 235/151.31; 324/158 T, 158 R, 158 D, 73 AT, 73 R

[56] References Cited

UNITED STATES PATENTS

| | | | |
|---|---|---|---|
| 3,333,326 | 8/1967 | Thomas, Jr. et al. | 29/574 |
| 2,707,356 | 5/1955 | Bayha | 324/73 X |
| 2,883,544 | 4/1959 | Robinson | 29/574 X |
| 3,236,374 | 2/1966 | Zimmerman et al. | 324/73 X |
| 3,508,151 | 4/1970 | Forcier | 324/158 |

Primary Examiner—Eugene G. Botz
Assistant Examiner—Edward J. Wise
Attorney—Harold Levine, James O. Dixon, Andrew M. Hassell, Melvin Sharp, Michael A. Sileo, Jr., Henry T. Olsen, Gary C. Honeycutt and John E. Vandigriff

[57] ABSTRACT

A system for arbitrary adjustment of device characteristics to produce parameter matched arrays or to do custom design utilizes computer control. The computer is linked with electron beam scanned testing to derive individual device characteristic information such as breakdown voltage, leakage, and switching time. From such derived information the computer generates a signal back to the electron beam, increasing its current intensity to heat the device and thereby change the device's characteristic properties. If bulk breakdown voltage is too low, for example, increased current intensity shifts the material toward n-type if done at about 500° C. in an N+p diode, this would increase bulk breakdown voltage. When it reaches the predetermined (computed) level, the beam cuts off.

21 Claims, 11 Drawing Figures

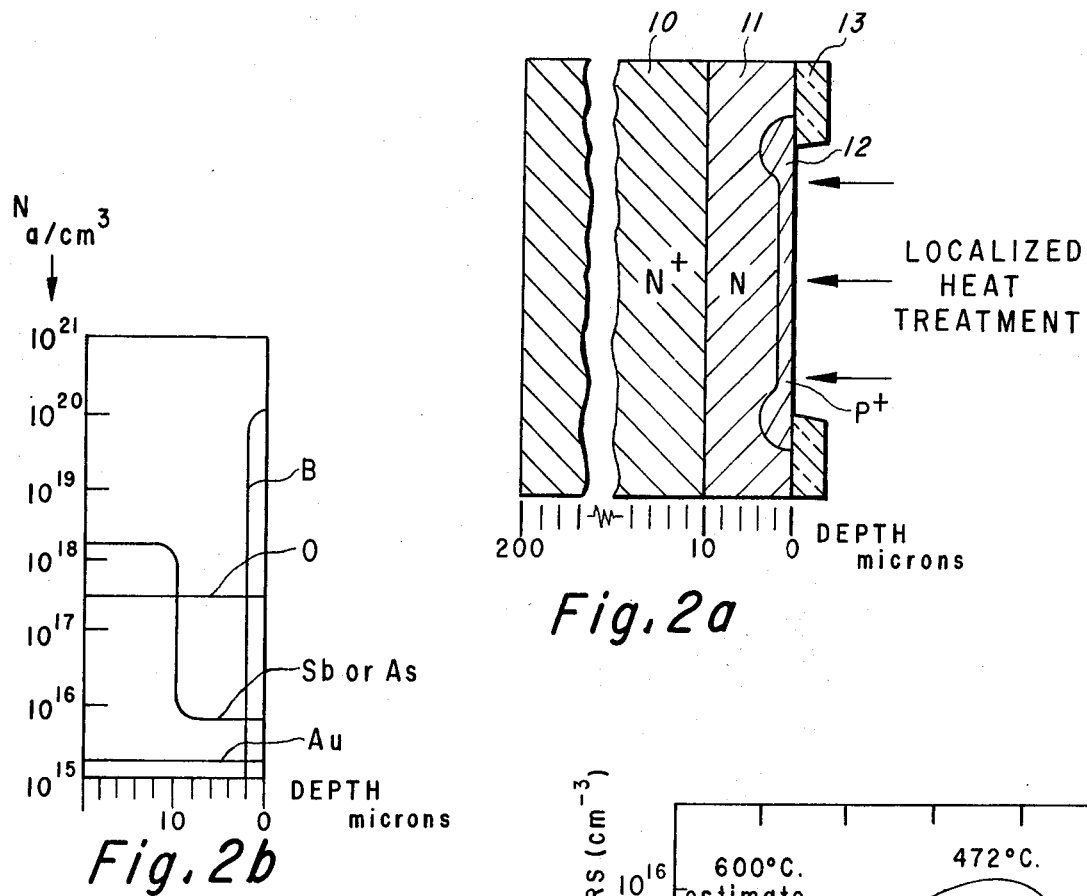
Fig. 2a
Fig. 2b
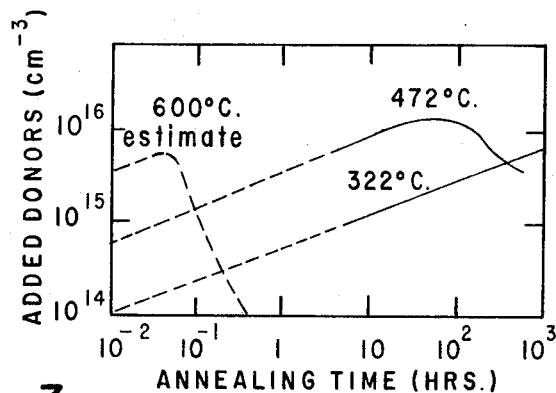
Fig. 3a
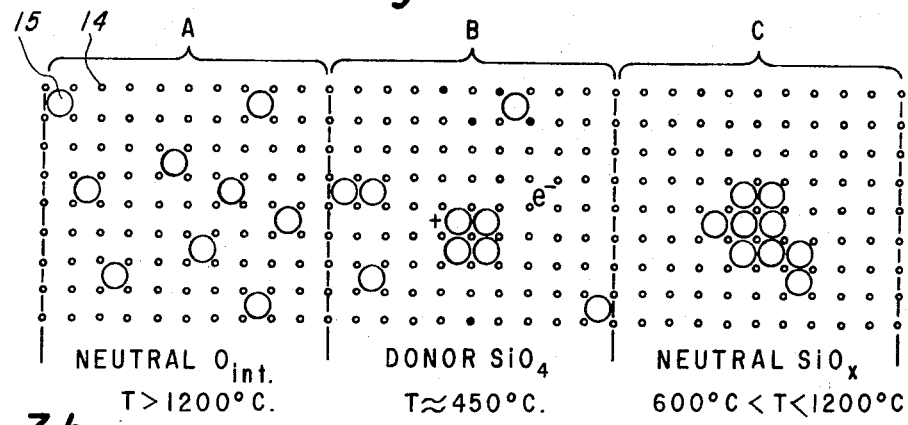
Fig. 3b

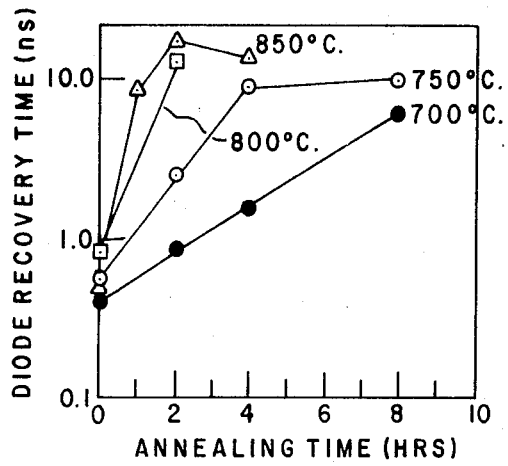
Fig. 4
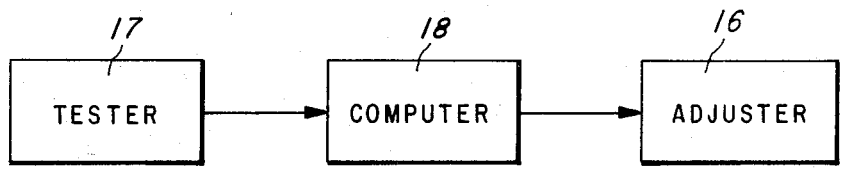
Fig. 5
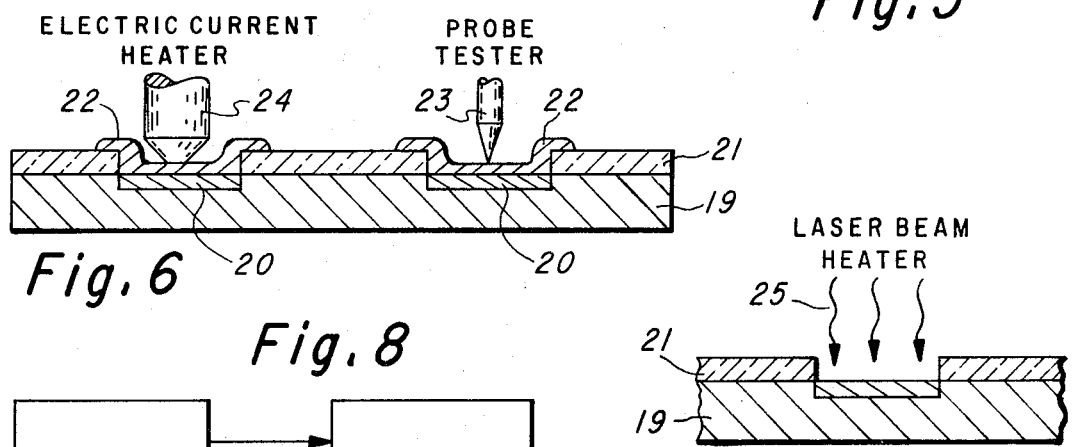
Fig. 6
Fig. 8
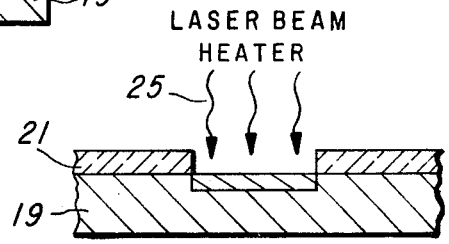
Fig. 7
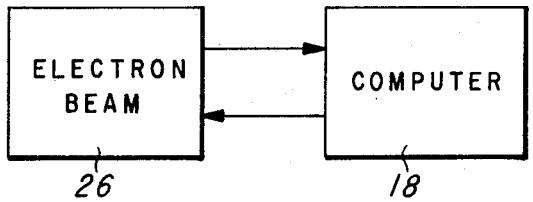
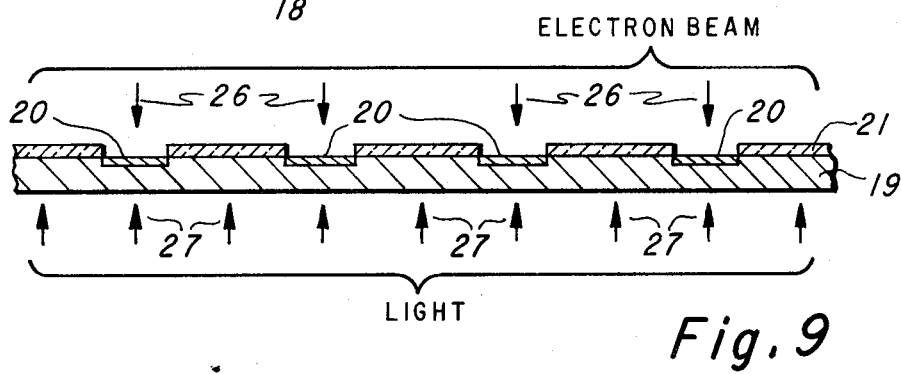
Fig. 9

3,674,995

COMPUTER CONTROLLED DEVICE TESTING AND SUBSEQUENT ARBITRARY ADJUSTMENT OF DEVICE CHARACTERISTICS

This invention relates to systems for fabricating semiconductor devices and integrated circuits, and more particularly to systems employing localized heat treatment to adjust the characteristic parameters of a device after fabrication is essentially complete.

This invention further relates to the inventions disclosed in copending patent application Ser. No. 68,099 for "Individual Device Tuning Using Localized Solid-State Reactions" assigned to the assignee of the present invention and filed of even date with the present application.

Present day semiconductor integrated circuits are designed using rather loose tolerances with regard to the characteristic parameters of individual devices across a slice. For example, the gain of a transistor ($h_{FE}$) in a typical integrated circuit is generally specified to be within 20-50 percent of some mean value. The various diffused resistors are presently designed to tolerances of ±20 percent, and the reverse breakdown voltages (collector-base $BV_{CBO}$) are designed with similar variances or are only required to exceed some specified minimum. These limits are generally set from empirically determined results using the best starting material and processing available under current standards in the art.

Integrated circuit manufactures can, to some extent, reduce the above tolerances in characteristic parameters by requiring more uniform starting material in terms of resistivity ($\rho$), dislocation density, oxygen content, and epitaxial layer thickness and impurity distribution. Similar improvements can be made by making the processing more consistent by automation or utilization of ion implantation, for example. However, aside from the increased expense required to achieve such improved tolerances, under the present state of the art, the best results foreseeable are somewhat less than a factor of 10 reduction in the range of parameter tolerances.

In addition, the fabrication of neighboring devices in an integrated circuit having widely varying switching times, but otherwise similar characteristics, is presently at most an extremely difficult task. The manufacture of a sequence of devices on a slice having a linear progression of switching times ranging from say 5 nanoseconds to 24 nanoseconds in precise increments of 1 nanosecond, for example, would be virtually impossible using presently known techniques in the art.

It is therefore an object of the present invention to provide a system for arbitrarily adjusting or tuning the characteristic parameters of each individual device of an array or integrated circuit.

Another object of the invention is to provide a system for fabricating arrays or integrated circuits with yields approaching 100 percent and with individual devices thereof matched to characteristic parameter tolerances of 1 percent or better.

Still another object of the invention is to provide a system for adjusting the characteristic parameters of each device of an array or integrated circuit to produce parameter matched arrays or to do custom design after fabrication of the array or circuit is essentially complete.

A further object of the invention is to provide means for both testing the characteristic parameters of each device of an array or integrated circuit and then adjusting such characteristic parameters to some desired value.

Still a further object of the invention is to provide a computer controlled system for testing the characteristic parameters of each device of an array or integrated circuit, computing the change in parameters necessary to meet predetermined requirements, and then adjusting the device parameters in accordance with such computed change.

These and other objects and advantages are achieved in accordance with the present invention by providing a system for arbitrarily adjusting the characteristic parameters of each individual semiconductor device of an array or integrated circuit utilizing localized heat treatment to cause a local solid-state reaction.

Localized heat treatment is provided by an electron beam, a heat or current probe, or a laser beam. The localized heat treatment is combined into a system with automatic parameter testing and utilizes computer control. The computer is linked with the test and adjust equipment. In a preferred embodiment, electron-beam scan testing is employed to derive individual device characteristic information such as breakdown voltage, leakage and switching time. From such derived information, the computer generates a signal back to the electron beam, increasing the beam's intensity to heat the device and thereby change the device characteristic properties. In order to get uniform heat treatment effect, the signal generated in the slice is played back while the beam is scanning the set of devices to be matched. If the bulk breakdown voltage of an $n^+p$ diode, for example, is too low, increased current intensity raises the temperature locally and shifts the material toward n-type if done at about 500° C. This would increase breakdown voltage.

As a result, devices in an array or integrated circuit can either be very closely matched or adjusted in an arbitrary or step function fashion from device to device. Neighboring devices, if adequately separated, would be little effected.

Still further objects and advantages of the invention will be apparent from the detailed description and claims and from the accompanying drawings wherein:

FIG. 2a illustrates a semiconductor $p^+n$ junction diode which is to be locally heat treated by the system of the present invention.

FIG. 2b illustrates a typical doping profile through the center of the diode of FIG. 2a.

FIGS. 3a and 3b illustrate the oxygen donor reaction as resistivity is effected by the system of the invention.

FIG. 4 is a graph illustrating the gold precipitation reaction as diode recovery time is effected by the system of the invention.

FIGS. 5-9 illustrate generally embodiments of the system of the present invention for carrying out the local heat treatment reactions.

Figure 1:
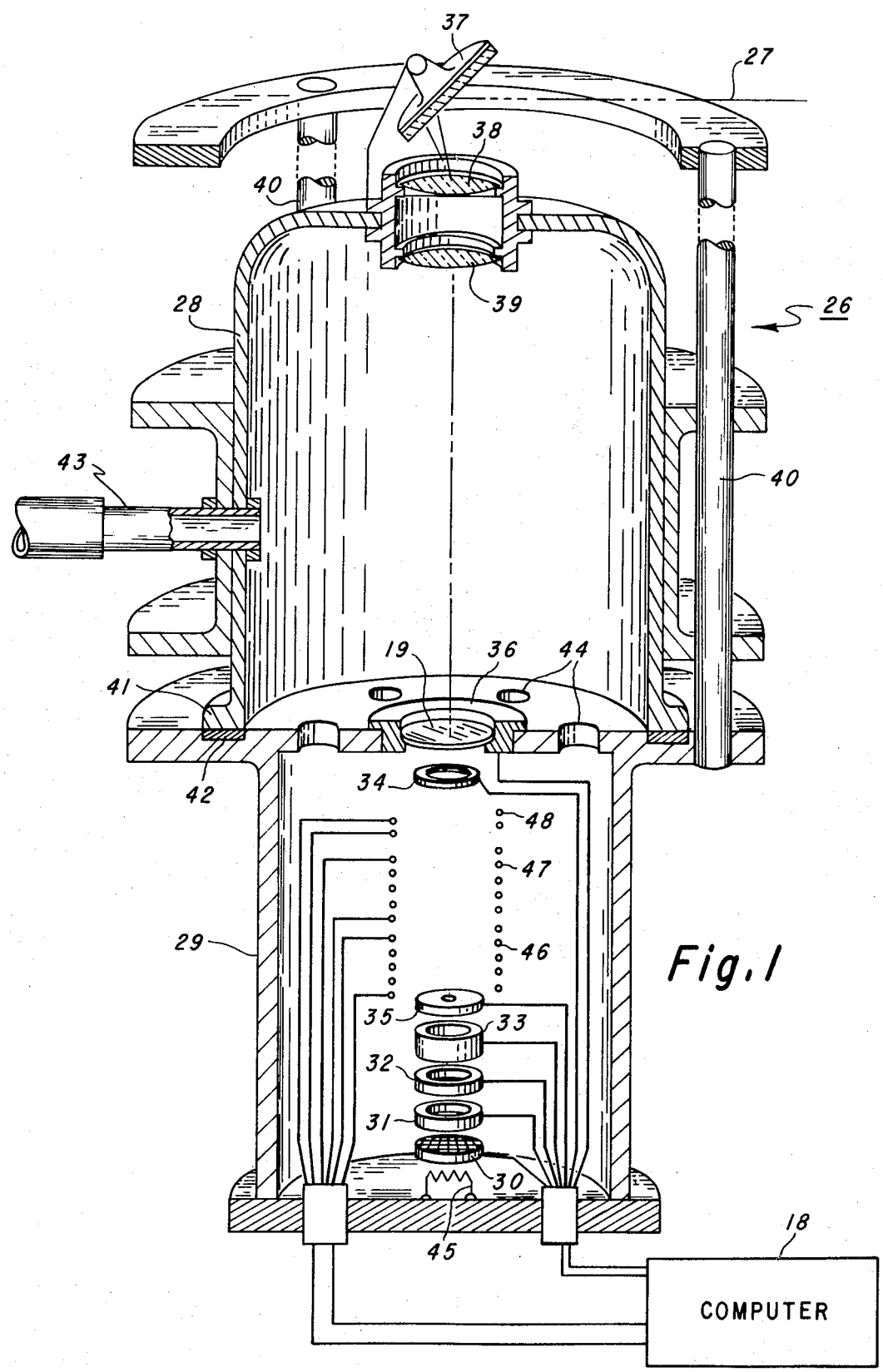
FIG. 1 illustrates one specific system embodied in the present invention for carrying out local heat treatment reactions.

Referring then to the drawings, FIG. 1 illustrates a preferred embodiment of the system of the present invention. Basically, the embodiment is comprised of electron beam apparatus 26 and computer means 18. Electron beam apparatus 26 is a bell jar type apparatus with upper chamber 28 and lower chamber 29. An electron beam is generated at cathode 30 and focused on a semiconductor device of substrate 19. When an electron beam is tuned on a device at a low intensity, a dark current is generated in substrate 19 which is measurable and from which parameters such as resistivity, for example, can be calculated. Evenly distributed light 27 is applied to the reverse side of substrate 19 as shown to measure minority carrier life-time in a similar manner. The difference between these measured parameters and desired parameters is then computed by computer means 18 and a calculation made to determine the intensity and time period which the electron beam must be played back on the device in order to tune it to the desired value. Then, the electron beam is thus again utilized, now however, for the purpose of increasing the heat applied to the device and to perform the specific desired solid state reaction. In some embodiments, a separate high current electron beam is utilized in the adjustment or heat treatment made as compared to a low current test beam.

Before continuing in the description of the system of the invention, it will be beneficial to first describe the heat treatment reactions performed by such system. FIG. 2a illustrates a semiconductor p-n junction device which is locally treated by the system of the present invention. Basically, the p-n junction is formed according to a standard method utilized in the semiconductor art such as alloying, diffusing or growing of an epitaxial layer. Illustrated is a semiconductor body having n+-type substrate 10, n-type layer 11 and p+-type region 12. Layer 13 is insulating material with an opening defining the position of the device. Then, at some time after the device has been fabricated, various parameters of the junction are altered or tuned by utilization of the system of the invention which selectively applies heat causing a desired semiconductor reaction. The heat may be applied to alter the junction parameters uniformly across the junction or only in various desired locations. Although FIG. 2a shows a single p-n junction, the system of the invention may be employed to operate on all semiconductor devices and therefore provides means for changing the parameters of resistors, diodes and transistors, whether fabricated as discrete devices or as part of an array or integrated circuit, and the system utilized after fabrication of the device, array or circuit is essentially complete.

A typical semiconductor doping concentration profile for the p+-n junction device of FIG. 2a is illustrated in FIG. 2b. The silicon slice from which the device was fabricated is shown to be a Czochralski slice with an oxygen concentration ($N_o$) of between about $3 \times 10^{17}$ and $10^{18}$ cm$^{-3}$ but may have been a Lopex slice with an oxygen concentration of between about $10^{16}$ and $3 \times 10^{16}$ cm$^{-3}$ or other. The gold (Au) impurity, which is used to control the minority carrier lifetime of silicon for diodes and transistors, has a concentration of about $2 \times 10^{15}$ cm$^{-3}$. Substrate portion 10 is heavily doped with antimony (Sb) or arsenic (As) to a concentration of about $2 \times 10^{18}$ to provide an n+-type material and layer 11 is doped with antimony or arsenic to a concentration of about $5 \times 10^{15}$ cm$^{-3}$ to provide an n-type layer on substrate 10. Finally, region 12 is doped with boron (B) to a concentration of about $10^{20}$ cm$^{-3}$. Other doping materials could be utilized, each having its own solid state reaction when heat treated by the system of the present invention. For purposes of this description, however, only the oxygen and gold reactions will be discussed in detail, as it is a common occurrence for a silicon slice to contain both of these materials. Furthermore, heat treatment of such a slice by the system of the present invention to affect an oxygen donor reaction and thereby primarily change the resistivity ($\rho$) of the material is independent of heat treatment of the slice to affect a gold precipitation reaction which primarily changes the minority carrier lifetime ($\tau$). Specifically, the oxygen reaction occurs at a temperature of between about 300°–600° C. while the gold reaction occurs at a temperature of between about 600°–900° C. It should be noted that both reactions occur at 600° C. The oxygen reaction may also take place at 600° C, for example, when the heat is applied for a very short time interval < 1.8 min. Although the gold reaction occurs at that temperature, the necessary time interval to make any appreciable change in minority carrier lifetime at 600° C would be considerably greater than 1.8 min. Both the oxygen donor reaction and the gold precipitation reaction as well as some other semiconductor reactions are shown in TABLE I below along with several semiconductor and device or circuit parameters affected by such reactions.

TABLE I.—LOCALIZED SOLID-STATE REACTIONS FOR INDIVIDUAL DEVICE ADJUSTMENT

| Solid-state reaction | Affected parameters | | | |
|---|---|---|---|---|
| | Diodes | Transistors | Resistors | Integrated circuits |
| Oxygen donor (300 to 600° C) | $\rho$ | $V_B$ | $BV_{CBO}$ | $R_s$ | $V_O, V_{OD}$ |
| Gold precipitation (600 to 1100° C) | $\rho, \tau$ | $t_r$ | $r_b', h_{FE}, t_s, V_{offset}$ | $R_s$ | $I_{IL}, I_{IH}$ $t_{PHL}, t_{PLH}$ |
| Zinc precipitation (500 to 800° C) | $\rho, \tau$ | $t_r$ | $r_b', h_{FE}, t_s, V_{offset}$ | $R_s$ | $t_{PHL}, t_{PLH}$ |
| Reverse bias instability (200 to 400° C) | $\tau$ | | $h_{FE}$ | | |
| Implantation anneal (500 to 900° C) | $\rho, \tau$ | $t_r$ | $r_b', h_{FE}, t_s$ | $R_s$ | |
| Substitution diffusion (900 to 1300° C) | $\rho$ | $V_b, t_r$ | $r_b', h_{FE}, t_s, BV_{CBO}$ | $R_s$ | |

The oxygen donor reaction performed by the system of the invention may be better understood with reference to FIGS. 3a and 3b. Illustrated in FIG. 3a is a graph showing added oxygen donor concentration as the semiconductor material is heated for a certain length of time at a specific temperature.

For example, at 600° C, from $3 \times 10^{15} - 5 \times 10^{15}$ donors per cm$^{-3}$ may be added to the present donor concentration of a slice by heating it for about 0.6 – 3.6 min. This reaction is represented in FIG. 3b by section B of a silicon crystal lattice having silicon atoms 14 and oxygen atoms 15 where donor $SiO_4$ is formed freeing an electron. If heated at 600° C for an appreciably longer period of time or at a temperature between 600° and 1,200° C (time period being dependent on the temperature) the reaction represented by section C of the crystal lattice where neutral $SiO_x$ occurs ($x$ being greater than 4). Thus, the reaction occurring at this temperature range can be used to extract donors and raise the resistivity of an n-type region. As represented in section A of the crystal lattice, isolated neutral oxygen atoms which are interstitial with respect to the silicon lattice are formed if the silicon is heated to a temperature beyond 1,200° C. It should be noted that, when reaction B is to be performed, it is preferable to begin with a slice which has first been annealed for an extended period of time at a temperature about 1,200° C so that the reaction at section A will take place. This is because it requires less energy to convert the isolated oxygen atoms to $SiO_4$ than to convert the $SiO_x$ complexes to $SiO_4$. That does not eliminate the use of a slice which has been annealed at a temperature between 600° and 1,200° C although such reaction would take somewhat longer than the above example would indicate.

An example of an oxygen donor reaction is shown below with reference to equations 1–10. The effect of the gold concentration on resistivity is ignored here for simplicity. If the gold were all electrically active, that is, not precipitated, it would tend to raise the resistivity and breakdown voltages somewhat. The basic reaction, however, would be quite similar. $\rho_n$ is the resistivity of an n-type semiconductor material. $n$ is equal to the density of electrons in conduction band. $N_D^+$ is equal to the density of donor impurity atoms (other than oxygen donors) and $N_{OD}^+$ is equal to the density of electrically active oxygen donor complexes. $\mu_n$ is the electron mobility (1,200 cm$^2$ volts$^{-1}$ sec$^{-1}$) and $q$ is the electron charge ($1.6 \times 10^{-19}$ coulombs). The resistivity of the n-type material may be approximated as follows:

$$\rho_n = 1/nq\mu_n \qquad (1)$$
$$\rho_n = 1/(N_D^+ + N_{OD}^+)q\mu_n \qquad (2)$$

Let us assume for purposes of this example that the donor concentration $N_D^+$ of layer 11 (FIG. 2a) is:

$$N_D^+ \cong 5 \times 10^{15} \text{ cm}^{-3} \qquad (3)$$

and the oxygen donor concentration $N_{OD}^+$ is:

$$N_{OD}^+ \cong 10^{14} \text{ cm}^{-3} \qquad (4)$$

According to equation (2):

$$\rho_n \cong 1.02 \ \Omega\text{cm}. \qquad (5)$$

and from standard tables (see W.R. Runyan, Silicon Semiconductor Technology, FIG. 8–23, McGraw-Hill Book Company) bulk breakdown voltage ($V_b$) is $$V_b \cong 100 \text{ volts} \qquad (6)$$

Now, in accordance with the heat treatment method of the present invention, when heat is applied to the device (as illustrated in FIG. 2a) at a temperature of 500° C for 1 min. approximately $10^{15}$ cm$^{-3}$ are added to the original oxygen donor concentration (see FIG. 3a). Thus:

$$N_{OD}^+ \cong 10^{14} \text{ cm}^{-3} \xrightarrow[1 \text{ min.}]{\text{H.T. 500° C}} 1.1 \times 10^{15} \text{ cm}^{-3} \qquad (7)$$

The total electron density is now:

$$n \cong 6.1 \times 10^{15} \qquad (8)$$

and the resistivity of the n-type material (layer 11 in FIG. 2a) has been changed to:

$$\rho_n \cong 0.85 \ \Omega\text{cm}. \qquad (9)$$

so that bulk breakdown voltage is now:

$$V_b \cong 90 \text{ volts} \qquad (10)$$

Other device and circuit parameters affected by changing the resistivity utilizing the oxygen donor reaction are shown in TABLE I.

It should be noted, that in the above example the diode was tuned to decrease bulk breakdown voltage. The guard-ring diffusion near the edge of layer 12 in FIG. 1a is one method of ensuring that bulk breakdown rather than edge breakdown will be the determining breakdown factor of the device. In an n⁺p diode the bulk breakdown voltage would have been increased by the applied heat treatment. On the other hand, the above p⁺n diode could also have had its bulk breakdown voltage increased slightly by heat treatment of the diode at 600° C, for example, for a time period greater than one hour according to reaction C of FIG. 2b).

The gold precipitation reaction performed by the system of the invention will now be discussed in detail with reference to FIG. 4. The most desired effect of this reaction is the changing of minority carrier lifetime ($\tau$), although as illustrated in TABLE I, the reaction may also affect resistivity and other related device and circuit parameters to some extent. Where both heat treatments are to be used, it is therefore preferable to perform the gold heat treatment first, and then perform the heat treatment for the oxygen donor reaction so that a final resistivity adjustment is made. Illustrated in FIG. 4 is a graph showing how diode recovery time ($t_r$, and similarly tranSistor switching time $t_s$) is affected by heat treatment of p⁺n diodes having about $2 \times 10^{16}$ cm⁻³ gold concentrations. According to the graph of FIG. 4, recovery time increases exponentially with heat treatment time (annealing time).

If $N_{Au(s)}$ is the concentration of gold in substitutional sites, the recovery time of a gold-doped diode (such as the diode illustrated in FIG. 2a) is given by the equation:

$$t_r = \text{const}/N_{Au(s)} \quad (11)$$

The following equation is therefore an empirical description of the concentration of this substitutional gold during the heat treatment:

$$N_{Au(s)} = N_{Au(s)_o} e^{-t/\tau_{H.T.}} \quad (12)$$

where $N_{Au(s)_o}$ is the initial concentration of substitutional gold, $t$ is time, and $\tau_{H.T.}$ is a time constant for the heat treatment process. From the chart of FIG. 4, $\tau_{H.T.}$ can be found for each annealing temperature, and is the time in which $t_r$ increases by a factor of $e$ (2.72). An Arrhenius plot of log $\tau_{H.T.}$ versus 1/T is a straight line, and hence $\tau_{H.T.}$ can be empirically written:

$$\tau_{H.T.} = \tau_{H.T._o} e^{H/kT} \quad (13)$$

where $k$ is *Boltzmann's constant*, $T$ is the absolute temperature, $H$ is the activation energy, and $\tau_{H.T._o}$ is the preexponential factor derived from the plot of $\tau_r$ versus 1/T. From the data of FIG. 4, $H$ is 1.36 eV and $\tau_{H.T._o} = 10^{-3}$ seconds.

For the diode of FIG. 2a then, the gold concentration is:

$$N_{Au} = 2 \times 10^{15} \text{ cm}^{-3} \quad (14)$$

Since the graph of FIG. 4 is for a diode having a gold concentration of $2 \times 10^{16}$ cm⁻³ and since $t_r$ is inversely proportional to $N_{Au(s)}$ from equation (11), a graph for the concentration expressed in equation (12) may be interpolated by multiplying the vertical axis of the graph of FIG. 4 by a factor of 10. Thus, the diode recovery time for the diode of FIG. 2a is about 8 ns. Now, in accordance with the heat treatment method of the present invention, when heat is applied to the device at a temperature of 800° C for 30 minutes the diode recovery time increases as follows:

$$t_r \simeq 8ns \xrightarrow[30 \text{ min.}]{\text{H.T. } 800° C} 20ns \quad (15)$$

Now that certain solid state reactions performed by the system of the present invention have been discussed in detail, specific embodiments of the system will next be disclosed. Referring then to FIG. 5, one embodiment of the system of the invention combines adjuster means 16 for the arbitrary heat treatment adjustment of device characteristics with tester 17 for automatic parameter testing. Thus, the tester 17 tests the devices the difference between the actual device parameters and desired device parameters is calculated and then adjustment means 16 adjusts the device parameters by the application of a quantity of heat as determined by the calculated difference. In the embodiment illustrated in FIG. 5, computer means 18 is utilized to perform the necessary calculations. Computer means 18 may be an analog or digital computer and may include additional control means so that the output of tester 17 is converted directly into information from which the computer can make its calculations and then provide a direct output signal for operation of adjuster 16. In this way, a plurality of devices fabricated on a single semiconductor slice are automatically adjusted to have a desired set of characteristics prior to their separation, already separated devices are automatically tested and adjusted when carried by conveyor means from tester 17 to adjuster 16, and devices in an array or integrated circuit are either very closely matched or adjusted in an arbitrary or step function fashion from device to device. Computer means 18 is thus capable of being programmed to make the calculations for one, some or all of the above operations.

Several means for testing and heat treatment adjustmenting are embodied in the system of the present invention. For example, with reference to FIG. 6, a small electrical current is passed through probe 23 comprising one embodiment of tester 17 to generate a signal for computer means 18 of FIG. 5 thereby testing diodes in an array having a plurality of regions 20 of one conductivity type formed on a substrate 19 of opposite conductivity type and having contacts 22 capable of withstanding the heat treatment formed in openings of insulating layer 21 to make electrical connection with regions 20. Simultaneously or sequentially, computer means 18 generates a high current signal which is applied to electric current heater 24 comprising an embodiment of adjuster 16 to adjust the characteristics of another diode in the array which had been previously tested and the necessary calculations for it made. The higher calculated current passing through the diode for a calculated period of time is enough to raise the temperature of the diode and thereby perform the desired solid state reaction. Neighboring diodes in the array are adequately separated so that they are not affected by the heat developed at the diode being adjusted. Next, either test probe 23 and heat probe 24 or substrate 19 is moved so that a device already tested is placed under heat probe 24 for adjustment and a yet untested device is placed under test probe 23.

Referring to FIG. 7, another means for heating a diode in the array of FIG. 6 embodied in the system of the invention to perform a desired solid state reaction and thereby adjust such device after it has been tested, is laser beam 25 which applies heat of calculated intensity for the correct period of time before contacts 22 are formed or after contacts 22 are formed if such contacts are designed to withstand the temperatures involved.

A preferred embodiment of the system of the invention for testing a device, calculating the difference between actual measured parameters and desired parameters and then adjusting the device parameters in accordance with the derived calculations is illustrated in FIGS. 1, 8 and 9. In this embodiment as shown in FIG. 8, the device is both tested and adjusted by electron beam apparatus 26. Computer means 18 includes control means which converts an electrical signal derived from the semiconductor slice when a low intensity electron beam is passed over the device into information from which the computer can make its calculations and then control the intensity and on-time of the electron beam to heat the device and thereby perform the desired solid state reaction. The electron beam provided by apparatus 26 may be scanned across the slice twice, first testing all devices and then adjusting all devices. Or, the beam may be tuned in to focus on each device on the slice, testing and adjusting the particular device and then tuned in to focus on another device.

Illustrated in FIG. 9 is the array of diodes formed by semiconductor substrate 19 of one conductivity type and regions 20 of opposite conductivity type. Again, layer 20 is insulating material having openings to define the diodes. When the electron beam is tuned on a device at a low intensity, a current is generated in substrate 19 which is measurable and from which parameters such as resistivity are calculated. Evenly distributed light 27 is applied to the reverse side of substrate 19 as shown to measure minority carrier lifetime in a similar manner. The difference between these measured parameters and desired parameters is then computed and a calculation made to determine the intensity and time period which the electron beam must be played back on the device being tuned. The electron beam is thus again utilized, now however, for the purpose of providing the necessary heat treatment in accordance with the invention to perform the desired solid state reaction.

Referring again to FIG. 1, computer means 18 may again be an analog or digital computer and includes additional control means so that the output of tester 17 is converted directly into information from which the computer can make its calculations and then provide a direct output signal for the reoperation of the electron beam of apparatus 26. In the case of a digital computer, for example, the control means comprises an analog-to-digital converter so that the analog signal generated in semiconductor substrate 19 can be digitized and a plurality of digital-to-analog converters for operating grids 31–34 of electron beam apparatus 26. In the case of an analog computer, all that is necessary are voltage converters to adjust the input and output voltages of computer 18 in accordance with the voltage which is generated in substrate 19 and with the voltages necessary to reoperate grids 31–34 after the necessary intensity of the beam has been computed. Computer 18 is also employed for controlling the on-time, positioning and focus of the beam.

The system of FIG. 1 operates as follows: Upper chamber portion 28 is raised by sliding it along support rods 40. A semiconductor slice comprised of substrate 19 on which a plurality of devices have been formed is then placed in electrically conductive holder 36 with the devices facing the electron beam provided by cathode 30 and anode 35. The back side of substrate 19 therefore faces in the direction of an evenly distributed light source provided light beam 27 is reflected by mirror 37 and transmitted by lenses 38 and 39 when necessary. Upper chamber portion 28 is then lowered again so that flange 41 securely meets rubber seal 42. The air in both upper chamber portion 28 and lower chamber portion 29 is pumped out through tubing 43 to create a vacuum in the chamber. Openings 44 keep the pressure in the upper and lower portions 28 and 29, respectively, equalized while flange 41 and rubber seal 42 keep the chamber airtight.

Next, an electron beam is generated at cathode 30 by heater 45. Computer means 18 controls the intensity of the beam which is relatively low during the test cycle, that is, somewhat less than the intensity necessary to heat the device and perform a solid state reaction in accordance with TABLE I. The electron beam is tuned in on any particular device by magnetic or electrostatic means 46 and 47 which operate the beam in X- and Y- directions and by focus means 48, all of which are also controlled by computer means 18. As the electron beam is tuned to a device, a dark current is generated in substrate 19 which is transmitted to computer means 18 via holder 36. From this generated signal, the resistivity of the slice, for example, is measured and compared with a desired level of resistivity. When light beam 27 is turned on, the minority carrier lifetime is measured from the signal generated in the slice and recovery or switching time calculated therefrom. Alternatively, the electron beam may be switched on and off sequentially to measure transients and thereby determine device recovery or switching time which is then compared with a desired recovery or switching time. From this comparison, in one embodiment computer 18 calculates the necessary electron beam intensity and on-time to perform the desired solid state reaction which it operates via electron acceleration grids 31–33 and electron deceleration grid 34.

In another embodiment the on-time and beam intensity are constant and applied in bursts. Computer means 18 then merely compares the actual device parameter with the desired device parameter at the end of each burst until the two quantities are equal. When the actual and desired parameters are the same, computer means 18 stops the operation.

Suppose for example that in the diode array of FIG. 8, the substrate 19 is n-type silicon with a carrier concentration of about $5 \times 10^{15}$ cm$^{-3}$ and the regions 20 are p-type. The substrate has applied to it a reverse bias of +95 volts and the impinging electrons are slowed down by decelleration grid 34 (FIG. 1) to an energy of less than 0.1 volts. Those regions of the sample that have a carrier concentration of $5 \times 10^{15}$ cm$^{-3}$ or smaller will not suffer breakdown under these conditions. However, diodes in regions with carrier concentrations larger than about $5.5 \times 10^{15}$ cm$^{-3}$ will breakdown under such conditions, and a large reverse current will be passed through these diodes. These diodes can be readily displayed as bright spots on a dark background on a television monitor or stored on video tape which in essence is computer means 18 for this embodiment. These diodes can then be made more uniform by (1) adding donors by a suitable heat treatment to those regions with less than $5.5 \times 10^{16}$ cm$^{-3}$ electrons, or (2) alternatively by extracting donors from those regions with electron concentrations greater than $5.5 \times 10^{16}$. Note that either (1) or (2) can be accomplished by a signal feedback scheme whereby the stored video signal is beamed back at the target at much higher current and/or energy so that localized heating of the slice occurs. The stored signal itself would be used for process (2), and the bright spots in the signal would generate local temperatures greater than 600° C for times long enough to reduce the oxygen donor concentration in the appropriate regions. This would be done in an iterative fashion, with alternating testing and heating until these regions were well matched in breakdown voltage with the unheated portions of the slice. Similarly, a negative of the stored signal would be fed back to the slice in order to accomplish process (1) above, which would be accomplished at temperatures of 600° C or lower.

In still a further embodiment, electron beam apparatus 26 of FIG. 1 is replaced by a completed semiconductor diode array vidicon tube. Computer means 18 then operates the electron beam of the vidicon in much the same way as it does the electron beam of apparatus 26 to test and tune the parameters of each diode of the semiconductor target slice.

Although significant detail has been placed on devices such as diodes in an array, for example, the system has equal ability to tune an integrated circuit to a given offset voltage or other parameter by the above techniques. Thus, though in many digital circuits of modern design, the tolerable variations in $h_{FE}$, $R_s$, $BV_{CBO}$, etc. are quite large, the final circuit can be tuned by local heat treatment of any of the discrete devices in the circuit. The diffused resistor values, for example, may be the most critical individual parameters in a given circuit, and a final adjustment of these resistors may be enough to bring the total circuit to a given specification.

Several embodiments of the method of the invention have now been described in detail. It is to be noted, however, that these descriptions of specific embodiments are merely illustrative of the principles underlying the inventive concept. It is contemplated that various modifications of the distinct embodiment, as well as other embodiments of the invention, will, without departing from the spirit and scope of the invention, be apparent to persons skilled in the art.

What is claimed is:

1. A system for the adjustment of device parameters of one or more devices of a semiconductor integrated circuit or array having a plurality of devices comprising:
    a. means for measuring the actual values of the respective parameters of each of said one or more devices to be adjusted,
    b. means for heating each of said one or more devices, and
    c. computer means for determining the differences between said actual parameter values and desired parameter values and for selectively operating said heating means responsive to said determined differences to independently heat each of said one or more devices in accordance with its respective difference.

2. The system of claim 1 wherein said computer meanS is comprised of:
    a. analog-to-digital conversion means for converting said measured actual parameter values into digital information,
    b. a digital computer for determining the difference between said actual parameter values and desired parameter values, and
    c. digital-to-analog conversion means for selectively operating said heating means in accordance with said determined differences.

3. The system of claim 1 wherein said computer means is comprised of:

a. analog computer means for determining the difference between said actual parameter values and desired parameter values and for generating a signal responsive to said difference and b. control means for selectively operating said heating means in accordance with said generated signal.

4. The system of claim 1 wherein said measuring means is comprised of a test probe and said heating means is comprised of a probe for passing current through a device.

5. The system of claim 1 wherein said heating means is comprised of a laser beam.

6. A system for matching device parameters of each of a plurality of semiconductor devices comprised of:

a. means for measuring the actual values of the parameters to be matched for each of said devices, b. means for applying heat to each of said devices, and c. computer means for determining the differences between said actual parameter values and desired parameter values and for selectively operating said heating means responsive to said determined differences to independently heat each of said one or more devices in accordance with its respective difference.

7. The system of claim 6 wherein said computer means is comprised of:

a. analog-to-digital conversion means for converting said measured actual parameter values into digital information, b. a digital computer for determining the difference between said actual parameter values and desired parameter values, and c. digital-to-analog conversion means for selectively operating said heating means in accordance with said determined differences.

8. The system of claim 6 wherein said computer means is comprised of:

a. analog computer means for determining the difference between said actual parameter values and desired parameter values and for generating a signal responsive to said difference and b. control means for selectively operating said heating means in accordance with said generated signal.

9. The system of claim 6 wherein said measuring means is comprised of a test probe and said heating means is comprised of a probe for passing current through a device.

10. The system of claim 9 wherein said plurality of devices are fabricated on a single semiconductor substrate and further characterized by said measuring means and said heat applying means being moveable with respect to said semiconductor substrate whereby each device is first tested and then heat treated.

11. The system of claim 6 wherein said measuring means is comprised of a test probe and said heating means is comprised of a laser beam.

12. The system of claim 11 wherein said plurality of devices are fabricated on a single semiconductor substrate and further characterized by said measuring means and said heat applying means being moveable with respect to said semiconductor substrate whereby each device is first tested and then heat treated.

13. A system for the adjustment of device parameters of one or more of a plurality of devices fabricated on a single semiconductor slice comprising:

a. means for applying an electron beam to said one or more devices, b. means for measuring current generated in said semiconductor slice when said electron beam is applied whereby actual device parameters are determined, c. computer means for determining the differences between said actual parameter values and desired parameter values and for selectively operating said electron beam responsive to said determined differences to independently heat each of said one or more devices in accordance with its respective difference.

14. The system of claim 13 wherein said computer means is comprised of:

a. analog-to-digital conversion means for converting said measured actual parameter values into digital information, b. a digital computer for determining the difference between said actual parameter values and desired parameter values, and c. digital-to-analog conversion means for selectively operating said electron beam in accordance with said determined differences.

15. The system of claim 13 wherein said computer means is comprised of:

a. analog computer means for determining the difference between said actual parameter values and desired parameter values and for generating a signal responsive to said difference and b. control means for selectively operating said electron beam in accordance with said generated signal.

16. The system of claim 13 wherein said computer means is comprised of:

a. means for recording the signal generated in the slice, b. means for playing back said recorded signal, and c. means for selectively operating said electron beam in accordance with the recorded signal when such recorded signal is played back.

17. The system of claim 13 including a vacuum chamber for containing said means for applying an electron beam, and said semiconductor slice.

18. The system of claim 17 including grid means for controlling the intensity of said electron beam, said grid means being controlled by said computer means.

19. The system of claim 18 wherein said plurality of devices are fabricated on one major surface of a semiconductor slice having said one major surface and an opposite major surface and the system including means for applying light to said opposite major surface.

20. The system of claim 18 wherein said vacuum chamber is demountable.

21. The system of claim 18 wherein said vacuum chamber is the envelope of a diode array vidicon and said semiconductor slice is the target of said vidicon.

* * * * *